US012589457B2

(12) United States Patent
Watanabe

(10) Patent No.: US 12,589,457 B2
(45) Date of Patent: Mar. 31, 2026

(54) SPINDLE UNIT AND PROCESSING APPARATUS

(71) Applicant: DISCO CORPORATION, Tokyo (JP)

(72) Inventor: Koji Watanabe, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 410 days.

(21) Appl. No.: 18/506,485

(22) Filed: Nov. 10, 2023

(65) Prior Publication Data

US 2024/0157493 A1     May 16, 2024

(30) Foreign Application Priority Data

Nov. 11, 2022     (JP) ................................. 2022-180767

(51) Int. Cl.
| | |
|---|---|
| *B23Q 5/26* | (2006.01) |
| *B23Q 1/70* | (2006.01) |
| *B23Q 5/04* | (2006.01) |
| *B24B 41/04* | (2006.01) |
| *F16C 32/06* | (2006.01) |
| *F16C 33/10* | (2006.01) |
| *B24B 41/06* | (2012.01) |

(52) U.S. Cl.
CPC .............. *B23Q 5/261* (2013.01); *B23Q 1/70* (2013.01); *B23Q 5/04* (2013.01); *B24B 41/04* (2013.01); *F16C 32/0614* (2013.01); *F16C 32/0622* (2013.01); *F16C 32/0681* (2013.01); *F16C 33/1015* (2013.01); *B24B 41/06* (2013.01)

(58) Field of Classification Search
CPC .. B23Q 5/261; B23Q 1/70; B23Q 5/04; B24B 41/04; B24B 41/06; B24B 47/12; B24B 49/10; F16C 32/0614; F16C 32/0622; F16C 32/0681; F16C 33/1015; F16C 2233/00; F16C 2380/26; B28D 5/00; B28D 7/00
See application file for complete search history.

(56) References Cited

U.S. PATENT DOCUMENTS

| 12,109,667 B2 * | 10/2024 | Watanabe ............... B24B 49/08 |
| 2017/0234365 A1 * | 8/2017 | Oshida ............... F16C 32/0692 |
| | | 451/259 |

FOREIGN PATENT DOCUMENTS

| JP | 2018015859 A | * | 2/2018 |
| JP | 2020183017 A | | 11/2020 |

* cited by examiner

*Primary Examiner* — Ryan J. Walters
(74) *Attorney, Agent, or Firm* — GREER BURNS & CRAIN, LTD.

(57) ABSTRACT

A spindle unit includes a casing defining a spindle housing space, a spindle housed in the spindle housing space with a gap from an inner wall of the casing and has a first large-diameter part and a second large-diameter part separated from the first large-diameter part in the axial direction, a motor coupled to a base end part of the spindle, a high-pressure air source, and a valve between the air source and an air supply path. When the valve is opened to introduce high-pressure air into the gap and the motor is rotated and the rotation speed of the spindle becomes equal to or higher than a predetermined rotation speed, the controller closes the valve to interrupt supply of the high-pressure air into the gap and the spindle is rotatably supported by a dynamic pressure air bearing enclosed in the gap and is dragged by the spindle's rotation.

4 Claims, 4 Drawing Sheets

SPINDLE UNIT AND PROCESSING APPARATUS

BACKGROUND OF THE INVENTION

Field of the Invention

The present invention relates to a spindle unit and a processing apparatus.

Description of the Related Art

A spindle unit or a spindle assembly included in a cutting apparatus that cuts a workpiece such as a semiconductor wafer rotatably supports a spindle to which a cutting blade is attached by a static pressure air bearing formed by supplying high-pressure air to surroundings of the spindle (for example, refer to Japanese Patent Laid-open No. 2020-183017). Furthermore, a spindle unit included in a grinding apparatus that grinds a workpiece rotatably supports a spindle that connects to a wheel to which grinding abrasive stones are attached by a static pressure air bearing formed by supplying high-pressure air to the surroundings of the spindle (for example, refer to Japanese Patent Laid-open No. 2018-015859). As above, in a processing apparatus including a processing tool that rotates at the time of processing, an air bearing is employed for the spindle unit that rotationally drives the processing tool.

SUMMARY OF THE INVENTION

The spindle unit in the cutting apparatus and the grinding apparatus of the related arts involves a problem that the amount of air supply (amount of air consumption) is large because the static pressure air bearing is formed by continuously supplying high-pressure air when the spindle is rotated. When the amount of air supply is large, problems that the power consumption of a compressor for supplying the high-pressure air becomes high and so forth occur.

Thus, an object of the present invention is to provide a spindle unit and a processing apparatus that can reduce the amount of consumption of air.

In accordance with an aspect of the present invention, there is provided a spindle unit including a casing inside which a spindle housing space is defined, a spindle that is housed in the spindle housing space of the casing with a gap from an inner wall of the casing and has a first large-diameter part and a second large-diameter part formed separately from the first large-diameter part in an axial direction, a motor operationally coupled to a base end part of the spindle, an air supply path formed in the casing, multiple high-pressure air supply holes that each have one end connected to the air supply path and another end communicating with the gap and are formed in the casing, a high-pressure air source, a valve inserted between the high-pressure air source and the air supply path, a rotation detection sensor that detects rotation of the spindle, and a controller connected to the motor, the valve, and the rotation detection sensor, wherein multiple first air flow adjusting grooves that adjust a flow of high-pressure air in the gap into a rotation direction of the spindle and cause the high-pressure air in the gap to be dragged by rotation of the spindle when the spindle is rotated are formed in side surfaces of the first large-diameter part, and multiple second air flow adjusting grooves that adjust a flow of the high-pressure air in the gap into the rotation direction of the spindle and cause the high-pressure air in the gap to be dragged by the rotation of the spindle when the spindle is rotated are formed in an outer circumference of the second large-diameter part, and a static pressure air bearing is formed in the gap, and the spindle is rotatably supported by the static pressure air bearing, when the valve is opened to introduce the high-pressure air from the high-pressure air source into the gap through the air supply path and the multiple high-pressure air supply holes and when rotation speed of the spindle has become equal to or higher than a predetermined rotation speed the controller closes the valve to interrupt supply of the high-pressure air into the gap, and the spindle is rotatably supported by a dynamic pressure air bearing that is enclosed in the gap and is dragged by the rotation of the spindle.

In accordance with another aspect of the present invention, there is provided a processing apparatus including a chuck table that holds a workpiece, a processing unit that processes the workpiece held by the chuck table by a processing tool mounted on a tip of a spindle of a spindle unit, and a controller that controls the spindle unit and the processing unit, wherein the spindle unit includes a casing inside which a spindle housing space is defined, the spindle that is housed in the spindle housing space of the casing with a gap from an inner wall of the casing and has a first large-diameter part and a second large-diameter part formed separately from the first large-diameter part in an axial direction, a motor operationally coupled to a base end part of the spindle, an air supply path formed in the casing, multiple high-pressure air supply holes that each have one end connected to the air supply path and another end communicating with the gap and are formed in the casing, a high-pressure air source, a valve inserted between the high-pressure air source and the air supply path, a rotation detection sensor that detects rotation of the spindle, and a controller connected to the motor, the valve, and the rotation detection sensor, wherein multiple first air flow adjusting grooves that adjust a flow of high-pressure air in the gap into a rotation direction of the spindle and cause the high-pressure air in the gap to be dragged by rotation of the spindle when the spindle is rotated are formed in side surfaces of the first large-diameter part, and multiple second air flow adjusting grooves that adjust a flow of the high-pressure air in the gap into the rotation direction of the spindle and cause the high-pressure air in the gap to be dragged by the rotation of the spindle when the spindle is rotated are formed in an outer circumference of the second large-diameter part, and a static pressure air bearing is formed in the gap, and the spindle is rotatably supported by the static pressure air bearing, when the valve is opened to introduce the high-pressure air from the high-pressure air source into the gap through the air supply path and the multiple high-pressure air supply holes and when rotation speed of the spindle has become equal to or higher than a predetermined rotation speed, the controller closes the valve to interrupt supply of the high-pressure air into the gap, and the spindle is rotatably supported by a dynamic pressure air bearing that is enclosed in the gap and is dragged by the rotation of the spindle.

According to the spindle unit and the processing apparatus of the present invention, when the workpiece is processed by the processing tool, the amount of consumption of air can be reduced by supporting the spindle that rotates by the dynamic pressure air bearing.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A spindle unit and a processing apparatus according to an embodiment of the present invention will be described below with reference to the accompanying drawings. The present invention is what is applied to a cutting apparatus as one example of a processing apparatus including the spindle unit. The processing apparatus to which the present invention is applied is not limited to the cutting apparatus and can be applied also to a grinding apparatus, a polishing apparatus, and so forth.

Figure 1:
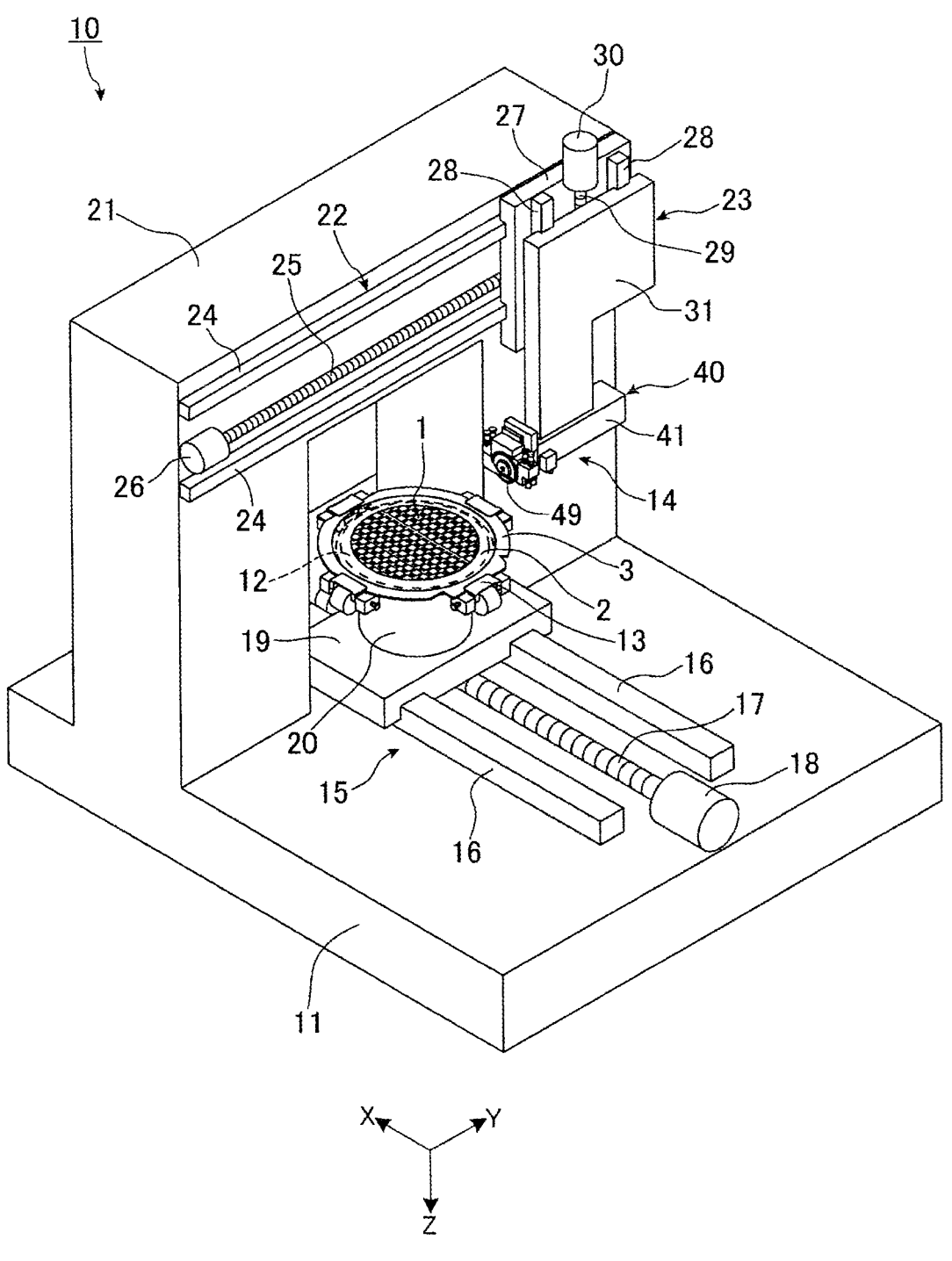
FIG. 1 is a perspective view of a cutting apparatus of an embodiment of the present invention.

A cutting apparatus 10 illustrated in FIG. 1 is what executes cutting processing of a workpiece 1. The cutting apparatus 10 includes a cutting mechanism 14 as a processing unit and includes a cutting blade 49 as a processing tool.

The workpiece 1 is a circular plate-shaped semiconductor wafer composed of silicon or the like, for example. On the front surface of the workpiece 1, devices are formed in multiple regions marked out by multiple planned dividing lines in a lattice manner. A tape 2 with flexibility is attached to the back surface side of the workpiece 1. An annular ring frame 3 is attached to an outer circumferential part of the tape 2.

The workpiece cut by the cutting apparatus 10 is not limited to the semiconductor wafer. For example, the workpiece may be an inorganic material substrate of a ceramic, glass, sapphire, or the like or a package substrate of a semiconductor product or the like.

An X-axis direction, a Y-axis direction, and a Z-axis direction in the cutting apparatus 10 are directions orthogonal to each other. The X-axis direction and the Y-axis direction are horizontal directions, and the Z-axis direction is the upward-downward direction. The X-axis direction is a processing feed direction in which the workpiece 1 is moved relative to the cutting blade 49 when cutting is executed along the planned dividing line. The Y-axis direction is an indexing feed direction in which the cutting blade 49 is moved in order to position the cutting blade 49 to the next planned dividing line after cutting processing of the planned dividing line. The Z-axis direction is a cutting-in feed direction in which the cutting blade 49 is moved when the cutting blade 49 cuts into the workpiece 1.

The cutting apparatus 10 includes a chuck table 12 over a base 11. The chuck table 12 includes a holding surface formed of a porous component such as a porous ceramic material on the upper surface side and can cause a suction force to act on the holding surface by a suction source (illustration is omitted). By the suction force on the holding surface, the workpiece 1 is sucked and held by the holding surface of the chuck table 12 with the interposition of the tape 2. Multiple clamps 13 are disposed around the chuck table 12 and the ring frame 3 around the workpiece 1 is clamped and fixed by the clamps 13.

A processing feed mechanism 15 for processing feed to move the chuck table 12 in the X-axis direction is disposed on the base 11 of the cutting apparatus 10. The processing feed mechanism 15 has a pair of guide rails 16 that are disposed on the base 11 and extend in the X-axis direction and a ball screw 17 that is disposed between the pair of guide rails 16 and extends in the X-axis direction. The ball screw 17 is rotationally driven by a motor 18 disposed at one end part of the ball screw 17. An X-axis moving table 19 is supported slidably in the X-axis direction relative to the guide rails 16 and has a screwing part (illustration is omitted) to which the ball screw 17 is screwed. When the ball screw 17 is rotated by the motor 18, the X-axis moving table 19 moves in the X-axis direction.

A rotation support part 20 that supports the chuck table 12 rotatably around the Z-axis direction is disposed on the X-axis moving table 19. The chuck table 12 is supported by an upper part of the rotation support part 20 and the chuck table 12 can be rotated by a motor (illustration is omitted) included in the rotation support part 20.

A gate-shaped column 21 that straddles the processing feed mechanism 15 is erected on the upper surface of the base 11. The column 21 is provided with an indexing feed mechanism 22 that moves the cutting mechanism 14 in the Y-axis direction (indexing feed) and a raising-lowering mechanism 23 that moves the cutting mechanism 14 in the Z-axis direction (cutting-in feed).

The indexing feed mechanism 22 has a pair of guide rails 24 that are disposed on the front face of the column 21 and extend in the Y-axis direction and a ball screw 25 that is disposed between the pair of guide rails 24 and extends in the Y-axis direction. The ball screw 25 is rotationally driven by a motor 26 disposed at one end part of the ball screw 25. A Y-axis moving table 27 is supported slidably in the Y-axis direction relative to the guide rails 24 and has a screwing part (illustration is omitted) to which the ball screw 25 is screwed. When the ball screw 25 is rotated by the motor 26, the Y-axis moving table 27 moves in the Y-axis direction.

The raising-lowering mechanism 23 has a pair of guide rails 28 that are disposed on the front face of the Y-axis moving table 27 and extend in the Z-axis direction and a ball screw 29 that is supported by the Y-axis moving table 27 and extends in the Z-axis direction. The ball screw 29 is rotationally driven by a motor 30 disposed at one end art of the ball screw 29. A Z-axis moving table 31 is supported slidably in the Z-axis direction relative to the guide rails 28 and has a screwing part (illustration is omitted) to which the ball screw 29 is screwed. When the ball screw 29 is rotated by the motor 30, the Z-axis moving table 31 moves in the Z-axis direction.

The cutting mechanism 14 includes a spindle unit 40 supported by the lower end of the Z-axis moving table 31. The structure of the spindle unit 40 will be described with reference to FIG. 2.

The spindle unit or spindle assembly 40 has a box-shaped casing 41 long in the Y-axis direction. A spindle housing space 42 is formed inside the casing 41 and a spindle 43 is disposed in the spindle housing space 42. The spindle unit 40 includes an air bearing that is formed by interposing high-pressure air in gaps SA and SB between the inside surface of the spindle housing space 42 and the outside surface of the spindle 43 and allows the casing 41 to rotatably support the spindle 43.

The spindle 43 has a first large-diameter part 44 and a second large-diameter part 45. The first large-diameter part 44 and the second large-diameter part 45 are parts arising from enlargement of the diameter of part of the spindle 43 and the first large-diameter part 44 and the second large-diameter part 45 are disposed in such a manner that the positions thereof are shifted in the Y-axis direction. The first large-diameter part 44 has a larger diameter than the second large-diameter part 45. Furthermore, the second large-diameter part 45 has a longer length in the Y-axis direction than the first large-diameter part 44.

Figure 3:
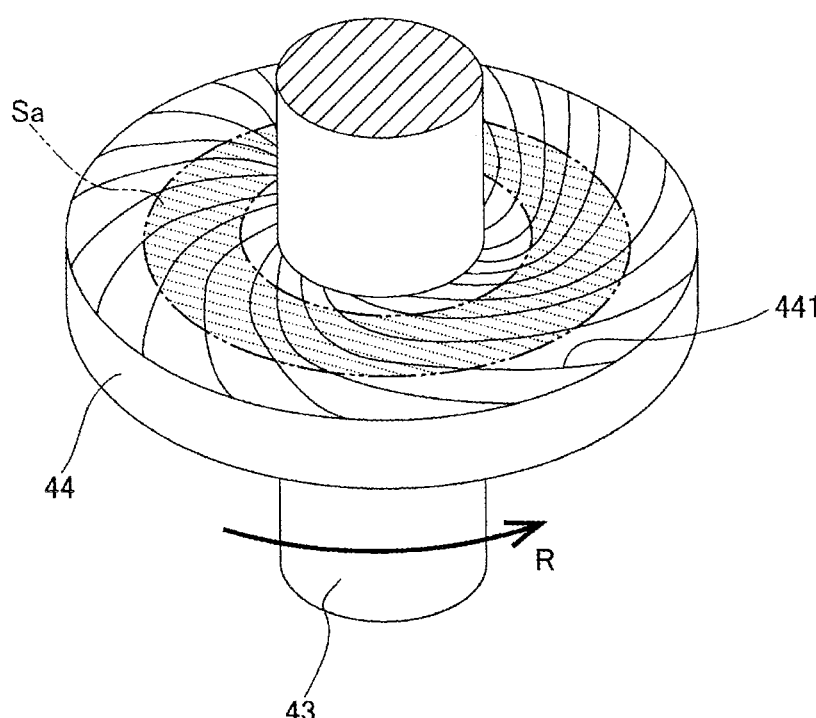
FIG. 3 is a perspective view illustrating a state in which a spindle is rotated and a high-pressure air layer is formed by air flow adjusting grooves in a first large-diameter part.

As illustrated in FIG. 3, air flow adjusting grooves 441 are formed in an end surface or a side surface of the first large-diameter part 44 in the Y-axis direction. The air flow adjusting grooves 441 include multiple groove parts that line up in the circumferential direction of the first large-diameter part 44 and the individual groove parts have a swirl shape that gets further away from the center as whirling in the circumferential direction of the first large-diameter part 44. Although FIG. 3 illustrates only one end surface of the first large-diameter part 44 in the Y-axis direction, the air flow adjusting grooves 441 are similarly formed also in the other end surface of the first large-diameter part 44.

Figure 4:
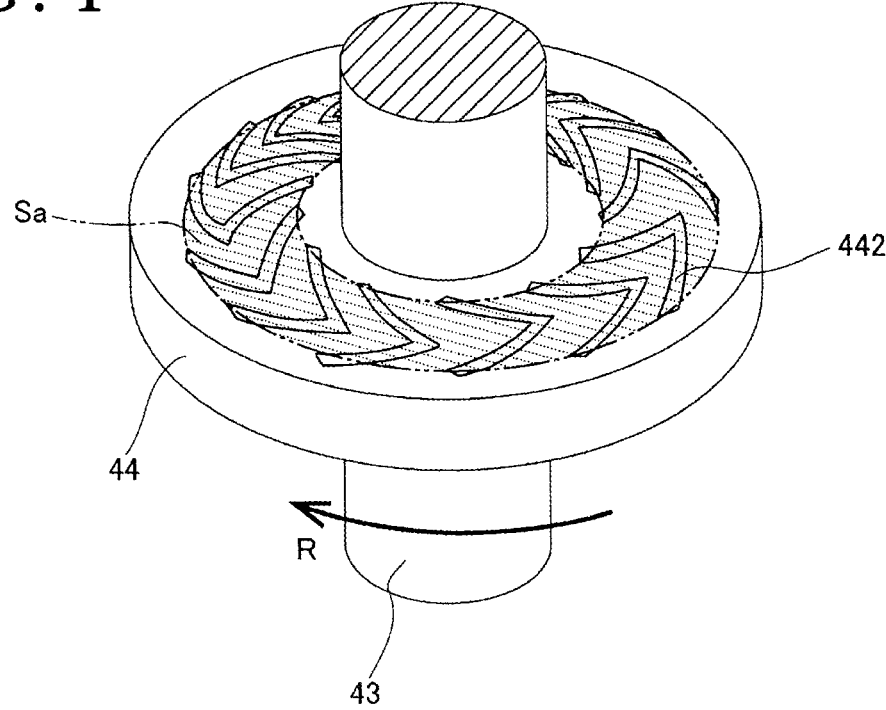
FIG. 4 is a perspective view illustrating the state in which the spindle is rotated and the high-pressure air layer is formed by the air flow adjusting grooves of another form in the first large-diameter part.

FIG. 4 illustrates air flow adjusting grooves 442 of another form made in the first large-diameter part 44. The air flow adjusting grooves 442 include multiple groove parts that line up in the circumferential direction of the first large-diameter part 44 and the individual groove parts have an arrowhead shape in which the tip of the arrowhead is oriented in the opposite direction to the rotation direction of the spindle 43. Although FIG. 4 illustrates only one end surface of the first large-diameter part 44 in the Y-axis direction, the air flow adjusting grooves 442 are similarly formed also in the other end surface of the first large-diameter part 44.

Figure 2:
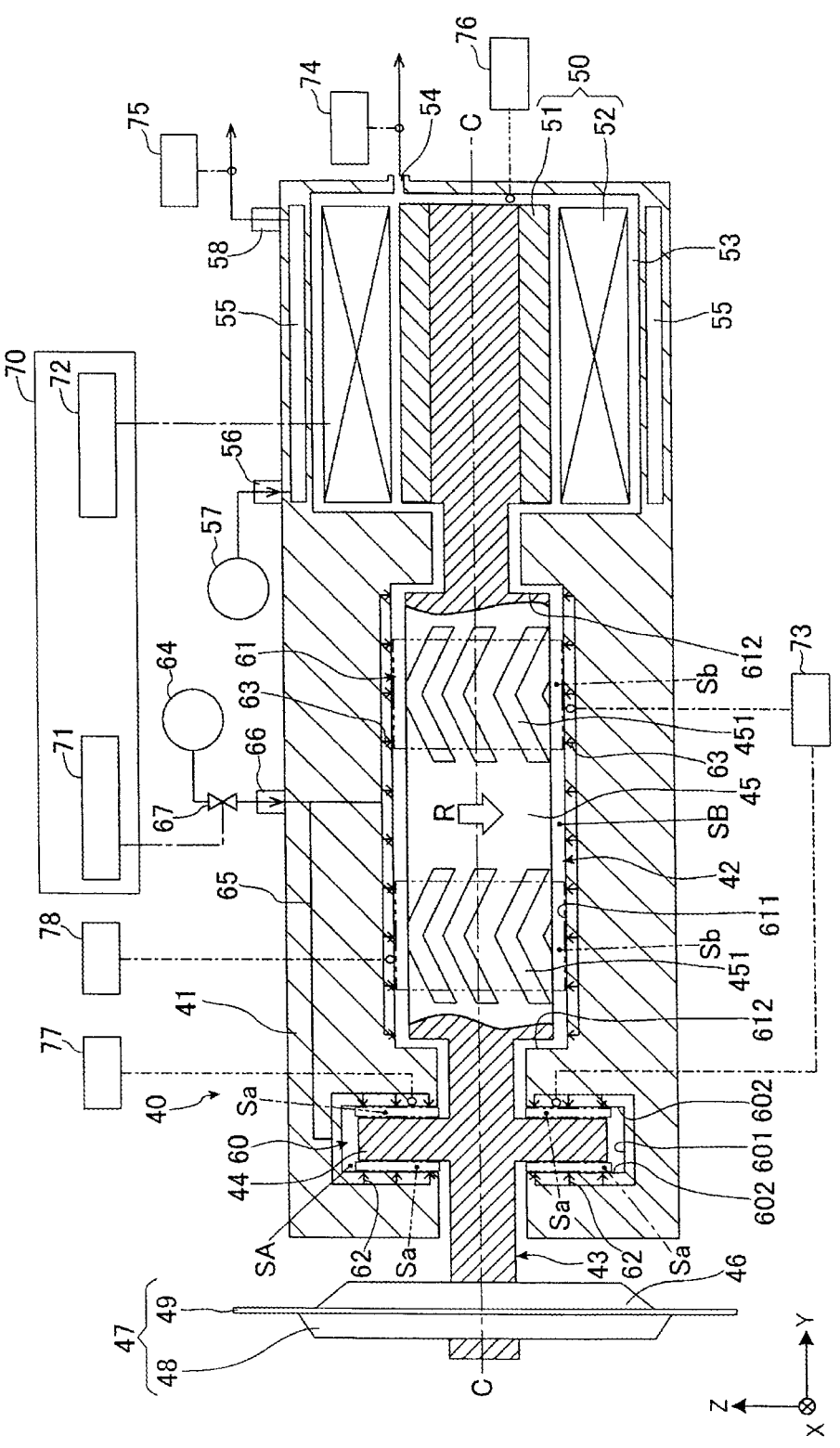
FIG. 2 is a sectional view of a spindle unit of the cutting apparatus.

Due to the making of the air flow adjusting grooves 441 or 442 with the above-described shape, ring-shaped high-pressure air layers Sa are formed in the gap SA that faces the air flow adjusting grooves 441 or 442 when the spindle 43 rotates in a rotation direction R (see FIG. 2, FIG. 3, and FIG. 4). As illustrated in FIG. 3, the rotation direction R of the spindle 43 when the high-pressure air layers Sa are formed is the direction in which the air flow adjusting grooves 441 with the swirl shape spread toward the outer circumferential side of the first large-diameter part 44. Furthermore, as illustrated in FIG. 4, the rotation direction R of the spindle 43 when the high-pressure air layers Sa are formed is the direction in which the air flow adjusting grooves 442 with the arrowhead shape spread. Due to the setting of the rotation direction R in this manner, when the spindle 43 rotates, air in the gap SA is collected by the air flow adjusting grooves 441 or 442 and high-pressure air in the gap SA is dragged by the rotation of the spindle 43.

As illustrated in FIG. 2, air flow adjusting grooves 451 are formed in the outer circumferential surface with a circular cylindrical shape in the second large-diameter part 45. In FIG. 2, a large part of the second large-diameter part 45 is represented in not sectional view but side view for the purpose of illustrating the air flow adjusting grooves 451. The air flow adjusting grooves 451 include multiple groove parts that line up in the circumferential direction of the second large-diameter part 45 and the individual groove parts have an arrowhead shape.

Due to the making of the air flow adjusting grooves 451 with the above-described shape, ring-shaped high-pressure air layers Sb are formed in the gap SB that faces the air flow adjusting grooves 451 when the spindle 43 rotates in the rotation direction R (see FIG. 2). The rotation direction R of the spindle 43 when the high-pressure air layers Sb are formed is set to the direction in which the air flow adjusting grooves 451 with the arrowhead shape spread. Due to the setting of the rotation direction R in this manner, when the spindle 43 rotates, air in the gap SB is collected by the air flow adjusting grooves 451 and high-pressure air in the gap SB is dragged by the rotation of the spindle 43.

The orientation and the arrangement of the air flow adjusting grooves 441 or 442 and the air flow adjusting grooves 451 are set in such a manner that the rotation direction R of the spindle 43 when the high-pressure air layers Sa are formed by the air flow adjusting grooves 441 or 442 of the first large-diameter part 44 (FIG. 3 and FIG. 4) corresponds with the rotation direction R of the spindle 43 when the high-pressure air layers Sb are formed by the air flow adjusting grooves 451 of the second large-diameter part 45 (FIG. 2).

A blade mount 46 is disposed at one end part of the spindle 43. A hub blade 47 can be attached and detached to and from the blade mount 46. The hub blade 47 includes the cutting blade 49 with a circular annular shape on a side surface of a hub 48. When the hub blade 47 is attached, the cutting blade 49 is oriented toward the blade mount 46 and the hub 48 is fixed to the spindle 43. The cutting blade 49 has a larger diameter than the blade mount 46 and the hub 48 and is fixed in the state in which the cutting blade 49 protrudes from the blade mount 46 in the radial direction.

The cutting blade is not limited to the illustrated configuration. For example, a cutting blade of a hub-less type may be used as the processing tool.

A motor 50 that rotates the spindle 43 is disposed at the other end part of the spindle 43. The motor 50 has a rotor 51 attached to an outer circumferential part of the spindle 43 and a stator 52 disposed to surround the rotor 51. The stator 52 is fixed to the internal of the casing 41. The rotor 51 includes a permanent magnet and the stator 52 includes coils obtained by winding a conductive wire. A force that rotates the spindle 43 is generated by energizing the stator 52.

The spindle housing space 42 is a space that extends in the Y-axis direction inside the casing 41. A virtual axis line that passes through the center of the spindle housing space 42 and extends in the Y-axis direction is defined as a center axis C. One end of the spindle housing space 42 is opened to an end part of the casing 41 and one end part of the spindle 43 (end part having the blade mount 46) protrudes to the outside of the casing 41 through this opening.

The other end side of the spindle housing space 42 communicates with a motor housing part 53. Inside the motor housing part 53, the stator 52 is fixed with such an arrangement as to surround the center axis C and the rotor 51 is disposed inside the stator 52. An air discharge port 54 that causes the internal and the external of the motor housing part 53 to communicate with each other is made in the casing 41.

A cooling water path 55 that surrounds the outside of the stator 52 is included inside the casing 41. A cooling water supply port 56 made in the outer surface of the casing 41 connects to the cooling water path 55 and cooling water is supplied from a cooling water source 57 outside the casing 41 to the cooling water path 55 through the cooling water supply port 56. The cooling water in the cooling water path 55 is discharged to the external from a cooling water discharge port 58 made in the outer surface of the casing 41. Heat generated in the motor 50 when the spindle 43 is rotated can be drawn by the cooling water that passes through the cooling water path 55 and the motor 50 can be cooled.

The spindle housing space 42 has, in the middle in the Y-axis direction, a first housing part 60 that houses the first large-diameter part 44 of the spindle 43 and a second housing part 61 that houses the second large-diameter part 45 of the spindle 43. The first housing part 60 has a circular cylindrical inner surface 601 that surrounds the center axis C of the spindle housing space 42 and a pair of side surfaces 602 that are opposed in the Y-axis direction and are parallel. The second housing part 61 has a circular cylindrical inner surface 611 that surrounds the center axis C of the spindle housing space 42 and a pair of side surfaces 612 that are opposed in the Y-axis direction and are parallel.

The inside surface of the spindle housing space 42 faces the outside surface of the spindle 43 with the gaps SA and SB made. The first housing part 60 has the gap SA between the circular cylindrical inner surface 601 and the outer circumferential surface of the first large-diameter part 44 and between the pair of side surfaces 602 and both end surfaces of the first large-diameter part 44 (surfaces in which the air flow adjusting grooves 441 or 442 are made). The second housing part 61 has the gap SB between the circular cylindrical inner surface 611 and the outer circumferential surface of the second large-diameter part 45 (surface in which the air flow adjusting grooves 451 are made) and between the pair of side surfaces 612 and both end surfaces of the second large-diameter part 45.

The spindle unit 40 includes high-pressure air supply holes that supply high-pressure air to the gaps SA and SB. Specifically, multiple high-pressure air supply holes 62 are formed in the pair of side surfaces 602 of the first housing part 60 and multiple high-pressure air supply holes 63 are formed in the circular cylindrical inner surface 611 of the second housing part 61. In FIG. 2, the high-pressure air supply holes 62 and the high-pressure air supply holes 63 are illustrated by arrow lines in a simplified manner. However, the high-pressure air supply holes 62 and the high-pressure air supply holes 63 are each configured as an opening part that opens to the inside surface of the spindle housing space 42.

The spindle unit 40 further includes an air supply path 65 that causes the high-pressure air supply holes 62 and 63 to communicate with a high-pressure air source 64. The high-pressure air source 64 has a compressor and sends out high-pressure air compressed by the compressor. The high-pressure air sent out from the high-pressure air source 64 is guided to the air supply path 65 in the casing 41 through an air supply port 66 made in the outer surface of the casing 41 and reaches the high-pressure air supply holes 62 and 63.

Due to the interposition of the high-pressure air supplied from the high-pressure air supply holes 62 and 63 in the gaps SA and SB, an air bearing with which the spindle 43 is rotatably supported by the casing 41 is configured.

More specifically, due to the high-pressure air supplied from the multiple high-pressure air supply holes 62 to the gap SA, the state in which the first large-diameter part 44 in the first housing part 60 floats between the pair of side surfaces 602 of the first housing part 60 is made, and a thrust bearing that supports the spindle 43 in the Y-axis direction is configured. Due to the high-pressure air supplied from the multiple high-pressure air supply holes 63 to the gap SB, the state in which the second large-diameter part 45 in the second housing part 61 floats inside the circular cylindrical inner surface 611 of the second housing part 61 is made, and a radial bearing that supports the spindle 43 in the radial direction is formed.

Therefore, the spindle unit 40 includes a static pressure air bearing that supports a load through generating a pressure by supplying the high-pressure air from the high-pressure air source 64 to the gaps SA and SB around the spindle 43 in the spindle housing space 42 and can rotatably support the spindle 43 by the static pressure air bearing.

A valve 67 that opens and closes the air supply path 65 is disposed between the air supply port 66 and the high-pressure air source 64. The high-pressure air is supplied from the high-pressure air source 64 to the air supply path 65 by opening the valve 67.

When the spindle 43 is rotated by the motor 50 at a predetermined rotation speed or higher in the state in which the high-pressure air is supplied to the gaps SA and SB, the high-pressure air is dragged by the rotation of the spindle 43 and is compressed in the spindle housing space 42. At this time, in the state in which supply of the high-pressure air from the high-pressure air source 64 is not executed, the high-pressure air layers Sa and Sb that can support the load of the spindle 43 and rotatably support the spindle 43 are formed in the gaps SA and SB between the inside surface of the spindle housing space 42 and the outside surface of the spindle 43. When the rotation detection senser 76 detects the rotation of the spindle 43 becomes the predetermined rotation speed or higher, the valve 67 is closed and the supply of the high-pressure air from the high-pressure air source 64 to the air supply path 65 is interrupted. That is, the spindle unit 40 includes a dynamic pressure air bearing in which the high-pressure air layers Sa and Sb are formed in the gaps SA and SB regarding which the supply of the high-pressure air from the high-pressure air source 64 is closed by the rotation of the spindle 43. Here, the predetermined time is for example the time until the high-pressure air layer Sa and Sb are stably formed or the time until the spindle 43 is stably rotated at the predetermined rotation speed or higher, and is set to three minutes to five minutes, for example.

The air flow adjusting grooves 441 or 442 made in both end surfaces of the first large-diameter part 44 have such a swirl shape or an arrowhead shape (arrow projection shape) as to narrow (collect) the air in the gap SA due to the rotation of the spindle 43 in the rotation direction R, and rotate and collect the air that interposes in the gap SA when the spindle 43 is rotated, so that a thrust bearing of the high-pressure air layer Sa is formed. Moreover, the air flow adjusting grooves 451 made in the outer circumferential surface of the second large-diameter part 45 have such an arrow projection shape as to narrow (collect) the air in the gap SB due to the rotation of the spindle 43 in the rotation direction R, and rotate and collect the air that interposes in the gap SB when the spindle 43 is rotated, so that a radial bearing of the high-pressure air layer Sb is formed.

In both the case of supporting the spindle 43 by the static pressure air bearing and the case of supporting the spindle 43 by the dynamic pressure air bearing, the pressure of the high-pressure air inside the spindle housing space 42 is adjusted through the air discharge port 54 made in the casing 41 and the spindle 43 can be supported with an appropriate air pressure without excess or deficiency.

Operation of the spindle unit 40 is controlled by a controller 70. The controller 70 includes a memory that stores a control program and a processor that executes the control program, and an operation signal is transmitted from the controller 70 to the respective parts of the spindle unit 40 to control the operation. As functional blocks of the controller 70, the controller 70 has an opening-closing control section 71 that controls opening and closing of the valve 67 and a motor control section 72 that controls rotation and stop of the spindle 43. The motor control section 72 causes execution of rotation and stop of the spindle 43 by the motor 50 through energization control to the stator 52.

The controller 70 may be a controller that executes overall control of the whole of the cutting apparatus 10. In this case, the controller 70 executes control also regarding operation of the processing feed mechanism 15, the rotation support part 20, the indexing feed mechanism 22, the raising-lowering mechanism 23, and so forth besides the spindle unit 40.

The spindle unit 40 includes a casing temperature measuring part 73 that measures the temperature of the casing 41, a discharged air temperature measuring part 74 that measures the temperature of air discharged from the air discharge port 54, and a cooling water temperature measuring part 75 that measures the temperature of the cooling water discharged from the cooling water discharge port 58. The casing temperature measuring part 73 measures the temperature of the vicinity of the first housing part 60 and the vicinity of the second housing part 61 in the casing 41. The measurement value of each of the casing temperature measuring part 73, the discharged air temperature measuring part 74, and the cooling water temperature measuring part 75 is input to the controller 70.

The flow of operation and control of the spindle unit 40 and the cutting apparatus 10 will be described with reference to a flowchart of FIG. 5. Suppose that the controller 70 is a controller that executes overall control of the whole of the cutting apparatus 10 in this operation example.

In the state in which the workpiece 1 is held by the chuck table 12 and preparation for cutting processing has been completed, the opening-closing control section 71 of the controller 70 transmits a valve opening signal to open the valve 67 (step S100). High-pressure air sent out from the high-pressure air source 64 passes through the air supply port 66 and the air supply path 65 and is supplied to the multiple high-pressure air supply holes 62 and the multiple high-pressure air supply holes 63. Thereupon, the high-pressure air from the high-pressure air source 64 interposes in the gaps SA and SB and the spindle 43 floats from the inside surface of the spindle housing space 42, and the casing 41 rotatably supports the spindle 43 (step S101).

At the stage of the step S101, the spindle 43 is supported with the form of a static pressure air bearing. The gap SA between the first housing part 60 of the casing 41 and the first large-diameter part 44 of the spindle 43 functions as a thrust bearing and the gap SB between the second housing part 61 of the casing 41 and the second large-diameter part 45 of the spindle 43 functions as a radial bearing. Thus, the spindle 43 is supported in such a manner as not to be in contact with the inside surface of the spindle housing space 42 in both the axial direction (Y-axis direction) and the radial direction.

Subsequently, the motor control section 72 of the controller 70 transmits a motor drive signal to energize the stator 52 of the motor 50. Thereupon, the spindle 43 to which the rotor 51 is attached rotates around the center axis C of the spindle housing space 42 (step S102). When the rotation speed of the spindle 43 becomes equal to or higher than a predetermined rotation speed, the high-pressure air layers Sa and Sb are formed in the gaps SA and SB between the outside surface of the spindle 43 and the inside surface of the spindle housing space 42 due to the rotation of the spindle 43 without relying on the supply of the high-pressure air from the high-pressure air source 64, and the state in which a dynamic pressure air bearing is formed is made (step S103). Here, in the case of employing the spindle unit 40 for dicing apparatus, the speed of the spindle 43 equal to or higher than the predetermined rotation speed is a rotation speed in a range of 20000 to 30000 rpm or higher, for example. In the case of employing the spindle unit 40 for grinding apparatus, the speed of the spindle 43 equal to or higher than the predetermined rotation speed is a rotation speed in a range of 3000 to 4000 rpm or higher, for example.

The controller 70 refers to a measurement result of the casing temperature measuring part 73, the discharged air temperature measuring part 74, the cooling water temperature measuring part 75, or the like and determines whether or not the state in which the dynamic pressure air bearing is formed has been made. That is, the air that interposes in the gaps SA and SB is rotated in the rotation direction R of the spindle 43 in association with the rotation of the spindle 43. In addition, the air is collected to become the high-pressure air layers Sa and Sb and the temperature rises. It may be determined that the high-pressure air layers Sa and Sb have been formed through sensing this temperature rise by the casing temperature measuring part 73, the discharged air temperature measuring part 74, or the cooling water temperature measuring part 75.

However, in general, whether or not the dynamic pressure air bearing has been formed is determined based on the rotation speed of the spindle 43 as described above. That is, the casing 41 is provided with a rotation detection sensor 76 that detects the rotation speed of the spindle 43 and it is determined that the dynamic pressure air bearing has been formed when the rotation speed of the spindle 43 detected by the rotation detection sensor 76 has become equal to or higher than a rotation speed set in advance. Furthermore, the rotation speed of the spindle 43 may be detected without using the rotation detection sensor 76. For example, the rotation speed of the spindle 43 may be detected through measuring the counter-electromotive force of the motor 50.

Moreover, whether or not the dynamic pressure air bearing has been formed may be determined based on the air pressure of the gaps SA and SB. That is, the casing 41 may be provided with a pressure sensor 77 that measures the air pressure of the gap SA and a pressure sensor 78 that measures the air pressure of the gap SB and it may be determined that the dynamic pressure air bearing has been formed when the pressures measured by the pressure sensors 77 and 78 with rotation of the spindle 43 has become equal to or higher than a pressure value set in advance.

Then, when the controller 70 determines that the state in which the dynamic pressure air bearing is formed has been made, a valve closing signal is transmitted from the opening-closing control section 71 to close the valve 67 (step S104). When the valve 67 closes, the state in which the supply of the high-pressure air from the high-pressure air source 64 to the gaps SA and SB of the spindle housing space 42 is closed is made, and the spindle 43 is supported by the dynamic pressure air bearing obtained by forming the high-pressure air layers Sa and Sb by the rotation of the spindle 43 while the spindle 43 continues the rotation. That is, the spindle 43 continues to be rotated with only the dynamic pressure air bearing without supplying the high-pressure air. After the valve 67 is closed in the step S104, operation of the compressor of the high-pressure air source 64 may be temporarily stopped until the valve 67 is opened in a step S106 to be described later.

Before the rotation of the motor 50 is started in the step S102, the supply of the high-pressure air from the high-pressure air source 64 to the gaps SA and SB is executed and the spindle 43 is made to float in the step S100 and the step S101. Thus, a transition to the supported state by the dynamic pressure air bearing can be smoothly made with suppression of action of collision of the outside surface of the spindle 43 with the inside surface of the spindle housing space 42 (galling).

In the state in which the spindle 43 is supported by the high-pressure air layers Sa and Sb of the dynamic pressure air bearing, cutting processing for the workpiece 1 is executed by the cutting blade 49 of the cutting mechanism 14 (step S105).

In the cutting processing, the controller 70 causes adjustment of the relative position of the chuck table 12 and the cutting blade 49 in the X-axis direction and the Y-axis direction by the processing feed mechanism 15 and the indexing feed mechanism 22 and positions the cutting blade 49 to the upper side of an end part of the planned dividing line that is the target of the cutting. Subsequently, the controller 70 moves the cutting mechanism 14 toward the lower side in the Z-axis direction by the raising-lowering mechanism 23. The cutting blade 49 is made to cut into the workpiece 1 held by the chuck table 12 while the cutting blade 49 rotates.

By causing movement (processing feed) of the chuck table 12 (X-axis moving table 19 that supports the chuck table 12) in the X-axis direction by the processing feed mechanism 15, the cutting processing is executed along the planned dividing line that extends in the X-axis direction.

After the cutting processing along the one planned dividing line is completed, the controller 70 moves the cutting mechanism 14 toward the upper side in the Z-axis direction by the raising-lowering mechanism 23 to separate the cutting blade 49 from the workpiece 1. Subsequently, the controller 70 causes movement (indexing feed) of the Y-axis moving table 27 in the Y-axis direction by the indexing feed mechanism 22 to position the cutting blade 49 to the upper side of an end part of the next planned dividing line that has not been cut. Then, similarly to the above description, movement (cutting-in feed) of the cutting blade 49 toward the lower side in the Z-axis direction is caused by the raising-lowering mechanism 23 and movement (processing feed) of the chuck table 12 in the X-axis direction is caused by the processing feed mechanism 15 to execute the cutting processing along the planned dividing line.

After the cutting along all planned dividing lines that line up in the Y-axis direction is completed, the controller 70 rotates the chuck table 12 by 90 degrees by the rotation support part 20. This causes the workpiece 1 on the chuck table 12 to become the state in which multiple planned dividing lines that have not been cut line up in the Y-axis direction (extend in the X-axis direction). Then, similarly to the above description, the cutting processing is sequentially executed along all planned dividing lines that have not been cut.

Until the cutting processing of the step S105 is completed, the motor control section 72 of the controller 70 continuously drives the motor 50 to continue the rotation of the spindle 43. This can execute the cutting processing in the state in which support of the spindle 43 by the dynamic pressure air bearing is executed.

After the cutting processing for the workpiece 1 is completed, the opening-closing control section 71 of the controller 70 transmits the valve opening signal to open the valve 67 (step S106). Due to the opening of the valve 67, high-pressure air from the high-pressure air source 64 passes through the air supply port 66 and the air supply path 65 and is supplied to the multiple high-pressure air supply holes 62 and the multiple high-pressure air supply holes 63, which makes the state in which the high-pressure air sent from the high-pressure air source 64 interposes in the gaps SA and SB between the outside surface of the spindle 43 and the inside surface of the spindle housing space 42.

Subsequently, the motor control section 72 of the controller 70 transmits a motor stop signal to end the energization to the stator 52 and interrupt the power supplied to the motor 50. Thereupon, the rotational force ceases to be generated in the motor 50 and the spindle 43 stops the rotation (step S107). The controller 70 refers to a measurement result of the casing temperature measuring part 73, the discharged air temperature measuring part 74, the cooling water temperature measuring part 75, or the like and determines whether or not the rotation of the spindle 43 has stopped. Furthermore, whether or not the rotation of the spindle 43 has stopped may be determined through measuring the counter-electromotive force of the motor 50. Moreover, whether or not the rotation of the spindle 43 has stopped may be determined with reference to a detection result of the rotation detection sensor 76. When it is determined that the rotation of the spindle 43 has stopped, the opening-closing control section 71 of the controller 70 transmits the valve closing signal to close the valve 67 (step S108).

Before the rotation of the motor 50 is stopped in the step S107, the supply of the high-pressure air from the high-pressure air source 64 to the gaps SA and SB has been executed in the step S106 and the static pressure air bearing has been formed. Thus, although the rotation speed of the spindle 43 lowers in association with the stop of the motor 50 and the dynamic pressure air bearing is made to disappear, the rotation of the spindle 43 can be smoothly stopped with prevention of action of collision of the outside surface of the spindle 43 with the inside surface of the spindle housing space 42 (galling).

As above, the spindle unit 40 and the cutting apparatus 10 of the present embodiment include the dynamic pressure air bearing in which the high-pressure air layers Sa and Sb are formed in the gaps SA and SB regarding which the supply of the high-pressure air from the high-pressure air source 64 is closed by the rotation of the spindle 43. Furthermore, when the cutting blade 49 that is the processing tool is rotated to process the workpiece 1, the spindle 43 continues to be rotated with only the dynamic pressure air bearing without supplying the high-pressure air from the high-pressure air source 64. The supply of the high-pressure air from the high-pressure air source 64 to the spindle housing space 42 is executed only at the stage at which the spindle 43 is made to float before the dynamic pressure air bearing is formed (step S100 and step S101) and the stage until the motor 50 is stopped after the processing (step S106). Therefore, the amount of consumption of air in the series of processing operation can be made small. By suppressing the amount of consumption of air, the operation cost of the spindle unit 40 can be reduced and efficient operation can be implemented.

The dynamic pressure air bearing involves the need to generate a sufficient air pressure to allow stable support of the spindle by rotation of the spindle and therefore is suitable for a processing apparatus in which the spindle is operated at high rotation speed. The cutting apparatus 10 of the present embodiment rotates the spindle 43 at high speed in processing and therefore is suitable to support the spindle 43 by the dynamic pressure air bearing in the processing.

However, the application of the present invention is not limited to the cutting apparatus and the present invention can be applied to an overall processing apparatus that supports a processing tool that rotates with the interposition of a spindle, such as a grinding apparatus and a polishing apparatus.

Figure 5:
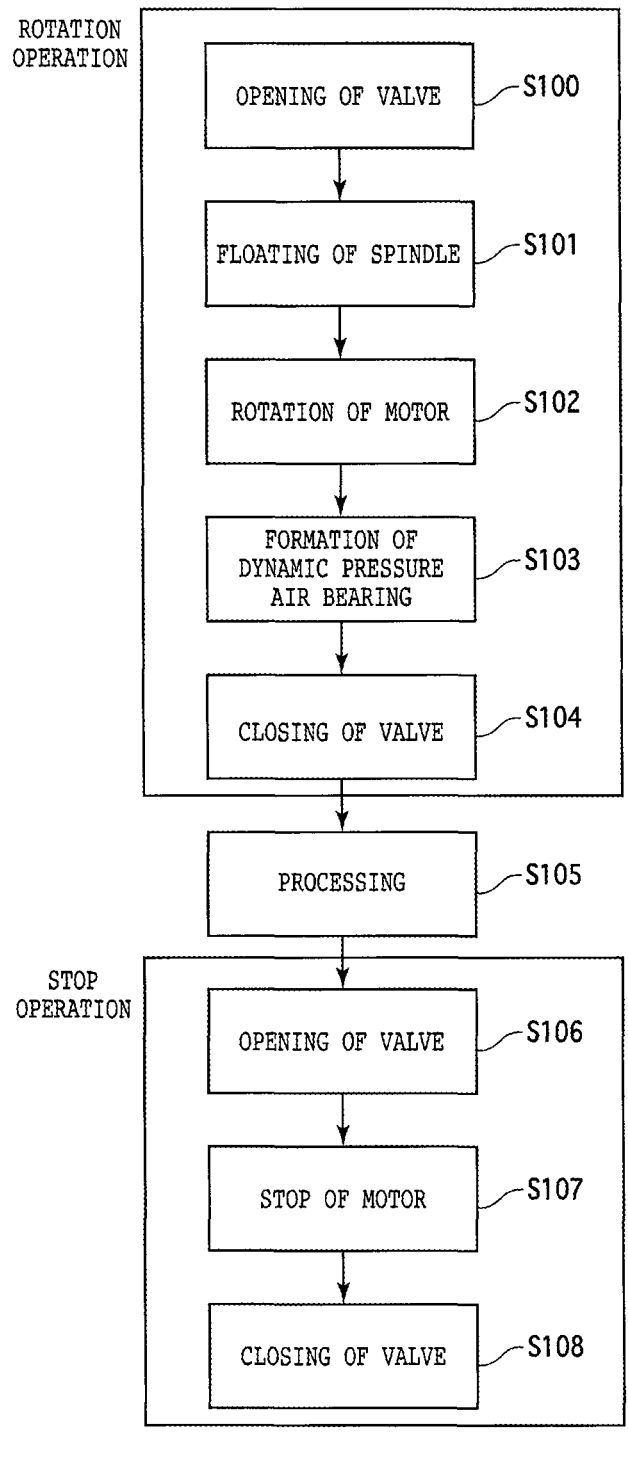
FIG. 5 is a flowchart illustrating the contents of control of operation of the cutting apparatus.

In the flowchart of FIG. 5, after the spindle 43 is made to float in the step S101, the operation automatically proceeds to the state in which switching to the dynamic pressure air bearing is executed in the step S103. However, it is also possible to include a step of determining whether or not to execute switching to the dynamic pressure air bearing.

For example, the static pressure air bearing, for which the supply of the high-pressure air from the high-pressure air source 64 is continuously executed, functions as a bearing even in the state in which the rotation speed of the spindle 43 is low. Thus, in the case of setting the rotation speed of the spindle 43 at the time of processing as a determination condition and processing the workpiece 1 under a processing condition in which the rotation speed of the spindle 43 is lower than a predetermined value, the cutting processing may be executed with continuation of the supply of the high-pressure air from the high-pressure air source 64 to the gaps SA and SB (that is, while formation of the static pressure air bearing is kept) without executing switching to the dynamic pressure air bearing in the step S103.

Furthermore, the load applied to the spindle 43 at the time of cutting processing differs depending on the hardness and the thickness of the workpiece 1. In addition, compared with the dynamic pressure air bearing, the static pressure air bearing is suitable for support when the load applied to the spindle 43 is comparatively large. Thus, in the case of setting a processing condition such as the hardness or the thickness of the workpiece 1 as a determination condition and executing cutting processing of the hard workpiece 1 or the workpiece 1 with a large thickness, the cutting processing may be executed with continuation of the supply of the high-pressure air from the high-pressure air source 64 to the gaps SA and SB (that is, while formation of the static pressure air bearing is kept) without executing switching to the dynamic pressure air bearing in the step S103.

Embodiments of the present invention are not limited to the above-described embodiment and modification examples and may be variously changed, replaced, or modified without departing from the gist of technical ideas of the present invention. Moreover, if a technical idea of the present invention can be implemented in another way on the basis of advancement of a technique or another technique that is derivative, the present invention may be carried out by using the method. Therefore, the scope of claims covers all embodiment modes that can be included in the range of technical ideas of the present invention.

As described above, the spindle unit and the processing apparatus of the present invention can reduce the amount of consumption of air for the air bearing and have high usefulness in a processing apparatus including a spindle rotatably supported by the air bearing and a processing tool.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A spindle unit comprising:
a casing inside which a spindle housing space is defined;
a spindle that is housed in the spindle housing space of the casing with a gap from an inner wall of the casing and has a first large-diameter part and a second large-diameter part formed separately from the first large-diameter part in an axial direction, wherein the gap comprises a first gap portion and a second gap portion;
a motor operationally coupled to a base end part of the spindle;
an air supply path formed in the casing;
multiple high-pressure air supply holes that each have one end connected to the air supply path and another end communicating with the gap and are formed in the casing;
a high-pressure air source;
a valve inserted between the high-pressure air source and the air supply path;
a rotation detection sensor that detects rotation of the spindle; and
a controller connected to the motor, the valve, and the rotation detection sensor,
wherein multiple first air flow adjusting grooves that adjust a flow of high-pressure air in the first gap portion into a rotation direction of the spindle and cause the high-pressure air in the first gap portion to be dragged by rotation of the spindle when the spindle is rotated are formed in side surfaces of the first large-diameter part, and multiple second air flow adjusting grooves that adjust a flow of the high-pressure air in the second gap portion into the rotation direction of the spindle and cause the high-pressure air in the second gap portion to be dragged by the rotation of the spindle when the spindle is rotated are formed in an outer circumference of the second large-diameter part, and
a static pressure air bearing is formed in the gap, and the spindle is rotatably supported by the static pressure air bearing, when the valve is opened to introduce the high-pressure air from the high-pressure air source into the gap through the air supply path and the multiple high-pressure air supply holes and when rotation speed of the spindle has become equal to or higher than a predetermined rotation speed, the controller closes the valve to interrupt supply of the high-pressure air into the gap, and the spindle is rotatably supported by a dynamic pressure air bearing that is enclosed in the gap and is dragged by the rotation of the spindle.

2. The spindle unit according to claim 1, wherein the first air flow adjusting grooves formed in the side surfaces of the first large-diameter part are formed into a swirl shape that gets further away from a center as whirling in circumferential direction.

3. The spindle unit according to claim 1, wherein the first air flow adjusting grooves formed in the side surfaces of the first large-diameter part have an arrowhead shape in which a tip of an arrowhead is oriented in an opposite direction to the rotation direction of the spindle, and the second air flow adjusting grooves formed in the outer circumference of the second large-diameter part of the spindle have an arrowhead shape in which a tip of an arrowhead is oriented in an opposite direction to the rotation direction of the spindle.

4. A processing apparatus comprising:
a chuck table that holds a workpiece;
a processing unit that processes the workpiece held by the chuck table by a processing tool mounted on a tip of a spindle of a spindle unit; and
a controller that controls the spindle unit and the processing unit, wherein
the spindle unit includes:

a casing inside which a spindle housing space is defined, the spindle that is housed in the spindle housing space of the casing with a gap from an inner wall of the casing and has a first large-diameter part and a second large-diameter part formed separately from the first large-diameter part in an axial direction, wherein the gap comprises a first gap portion and a second gap portion;

a motor operationally coupled to a base end part of the spindle, an air supply path formed in the casing, multiple high-pressure air supply holes that each have one end connected to the air supply path and another end communicating with the gap and are formed in the casing, a high-pressure air source, a valve inserted between the high-pressure air source and the air supply path, a rotation detection sensor that detects rotation of the spindle, and a controller connected to the motor, the valve, and the rotation detection sensor, wherein multiple first air flow adjusting grooves that adjust a flow of high-pressure air in the first gap portion into a rotation direction of the spindle and cause the high-pressure air in the first gap portion to be dragged by rotation of the spindle when the spindle is rotated are formed in side surfaces of the first large-diameter part, and multiple second air flow adjusting grooves that adjust a flow of the high-pressure air in the second gap portion into the rotation direction of the spindle and cause the high-pressure air in the second gap portion to be dragged by the rotation of the spindle when the spindle is rotated are formed in an outer circumference of the second large-diameter part, and a static pressure air bearing is formed in the gap, and the spindle is rotatably supported by the static pressure air bearing, when the valve is opened to introduce the high-pressure air from the high-pressure air source into the gap through the air supply path and the multiple high-pressure air supply holes and when rotation speed of the spindle has become equal to or higher than a predetermined rotation speed, the controller closes the valve to interrupt supply of the high-pressure air into the gap, and the spindle is rotatably supported by a dynamic pressure air bearing that is enclosed in the gap and is dragged by the rotation of the spindle.

\* \* \* \* \*